Oct. 13, 1970 P. B. KNAPP 3,533,535
HIGH SPEED SINGULATING DEVICE
Filed July 9, 1968 5 Sheets-Sheet 1

INVENTOR.
PHILIP B. KNAPP
BY
ATTORNEY

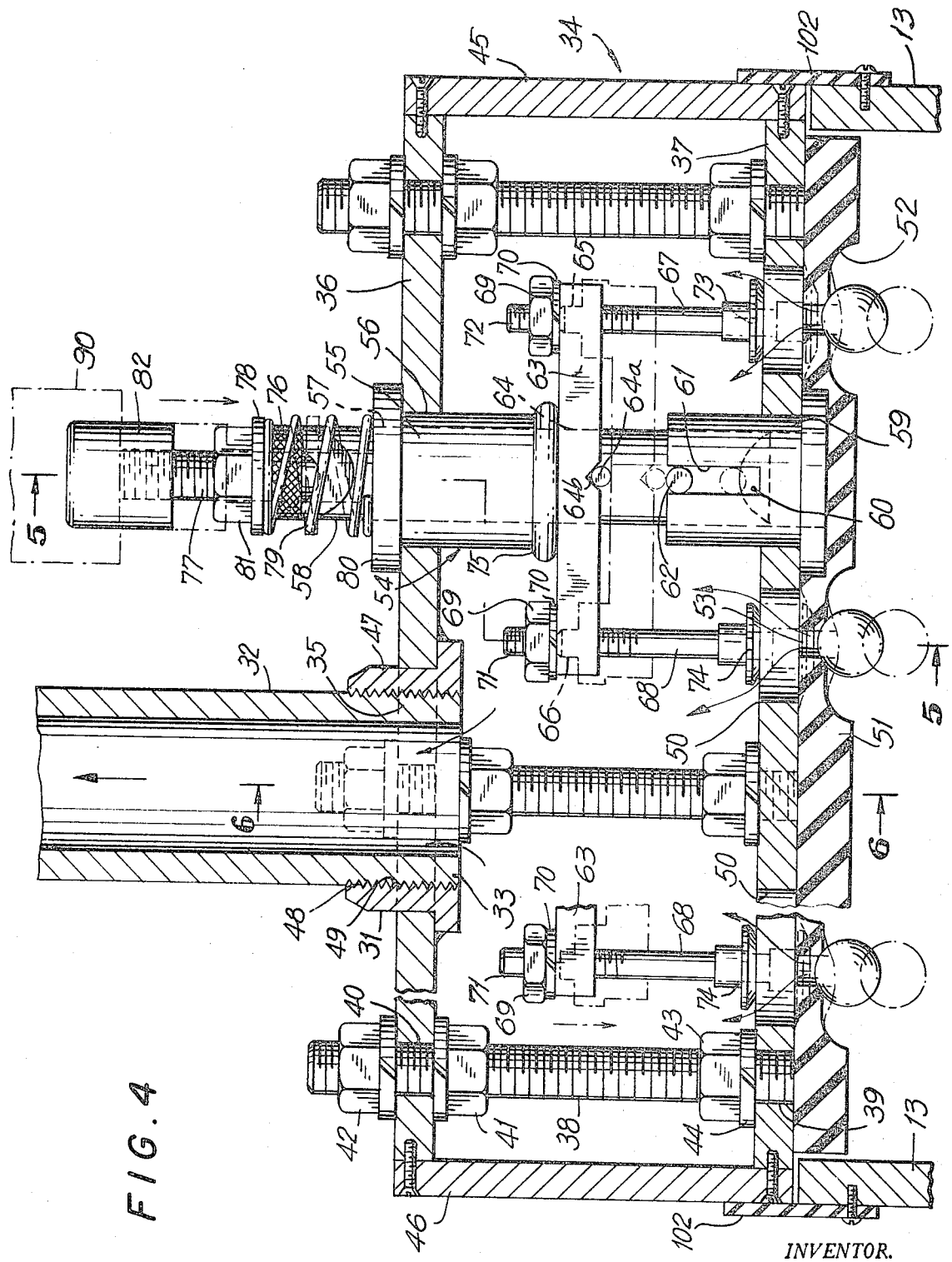

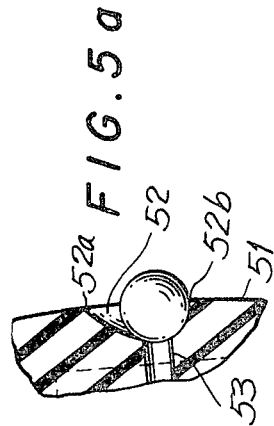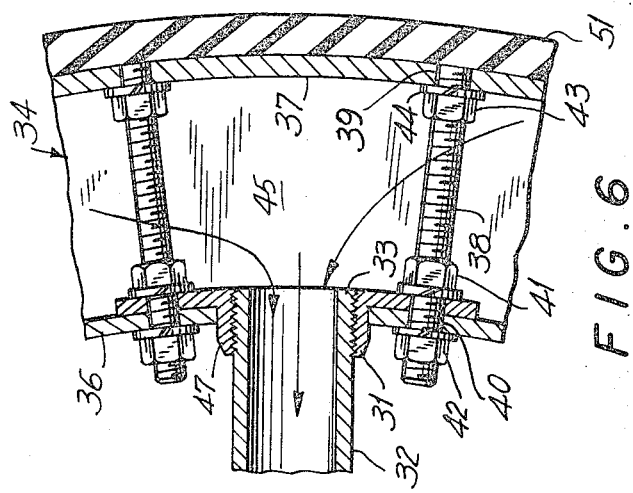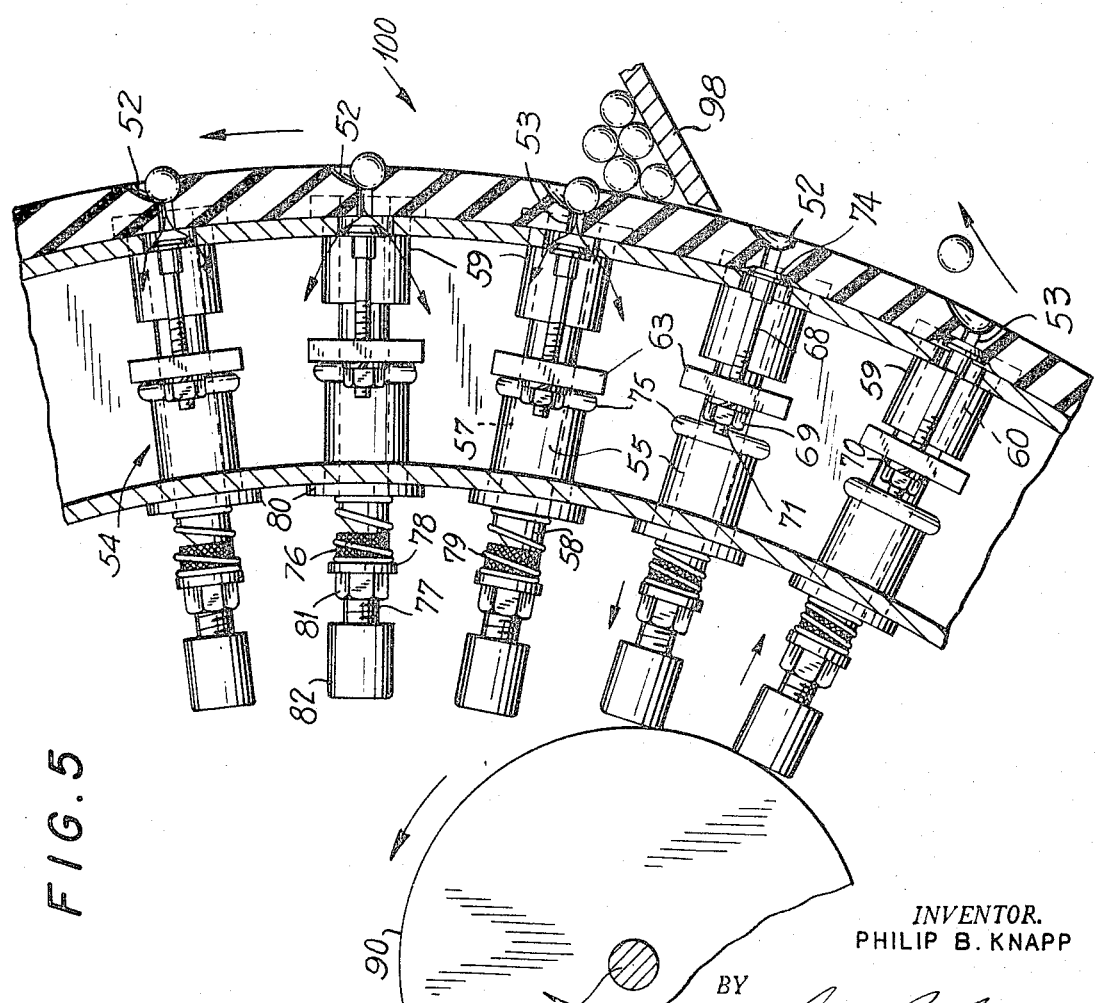

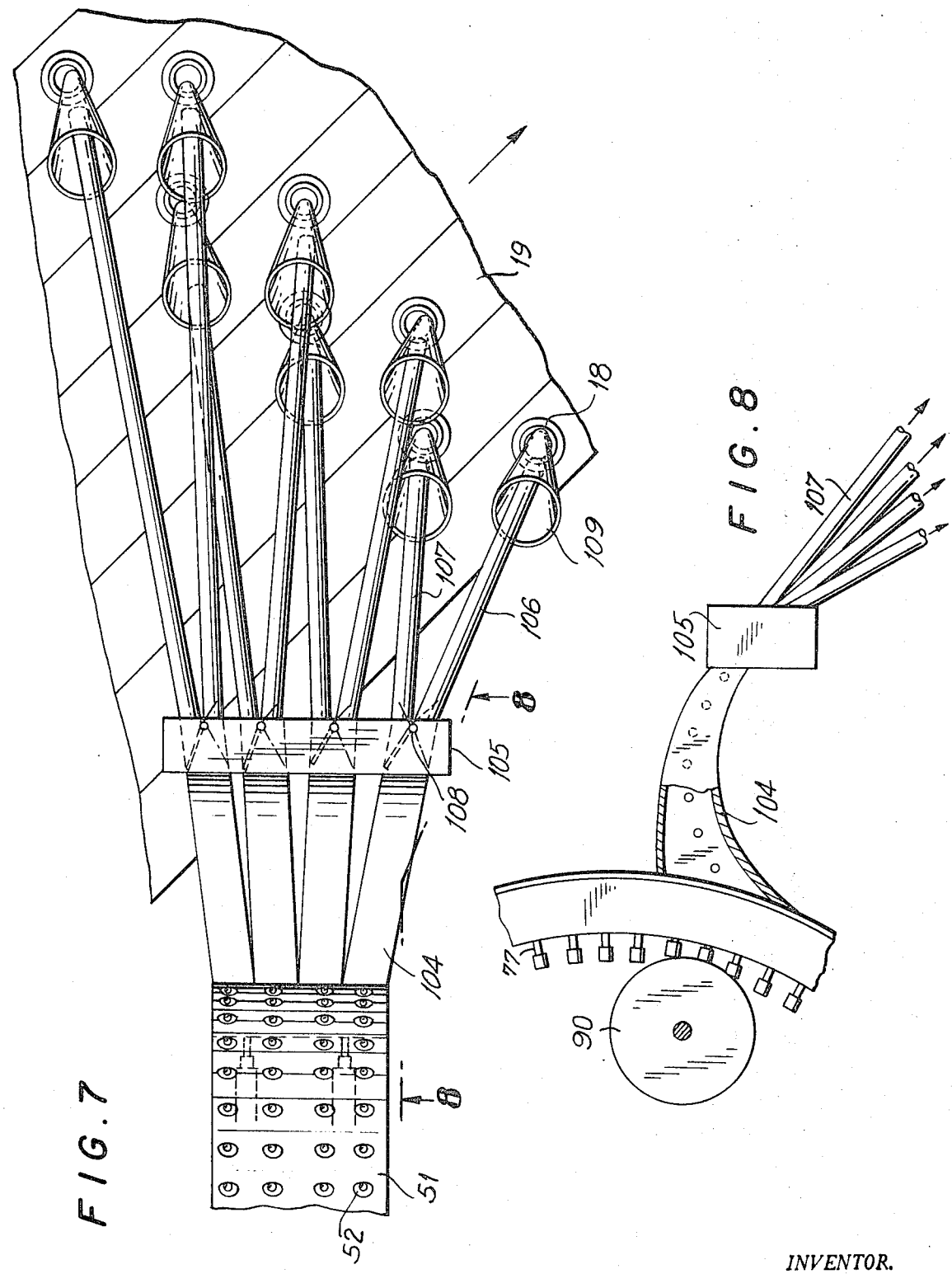

United States Patent Office 3,533,535
Patented Oct. 13, 1970

3,533,535
HIGH SPEED SINGULATING DEVICE
Philip B. Knapp, Lynbrook, N.Y., assignor to Aptek Industries, Inc., Lynbrook, N.Y., a corporation of New York
Filed July 9, 1968, Ser. No. 743,520
Int. Cl. B23q 7/04
U.S. Cl. 221—211
11 Claims

ABSTRACT OF THE DISCLOSURE

A singulating device for removing articles from a bulk hopper and discharging the same at a counting or discharge station at high speeds.

---

This invention is in the field of singulating devices, and more particularly devices for removing units, such as pills, seeds, nuts, machine parts, ball bearings or the like, of regular or irregular shapes, from a bulk supply and depositing the same at a discharge station or stations, either at random or in predetermined orientation.

As is well known, the discharge station may be coupled with a counting mechanism and a feed mechanism to feed selected number of the articles into containers carried by a conveyor which may be advanced after the containers are filled to position a second series of containers at the discharge station.

Singulating devices heretofore known have been restricted in their operation and particularly in the number of articles which may be processed in a given time by reason of a number of drawbacks inherent therein. While it is known, for instance, to employ vacuum assisted rotating drum type singulators wherein articles from a bulk supply are supported on the periphery of the drum, such devices have been incapable of high speed operation.

In assessing the failures of prior units, it shall be recognized that to successfully operate at high speeds, both the pickup and the discharge must be rapidly accomplished. Specifically, the overall capacity of any such device is limited by the slower of the discharge or pickup functions and improvement of one function without the other will not work any increase in capacity.

Further, while known units purporting to be high capacity devices have been capable of handling relatively unbreakable articles, such as ball bearings, tool parts, nuts, etc., their handling of fragile articles, such as pills, seeds or the like, has been so rough as to induce a significant proportion of damaged items.

Typically, known singulating apparatuses have employed suction communicated to the periphery of a drum in some manner, during the passage of the drum through a hopper, as a means of maintaining the articles on the surface of the drum. When a segment of the drum bearing the articles is disposed at the discharge station, the vacuum source is interrupted and it is contemplated that the articles previously retained by vacuum will be released.

Other expedients for promoting release of the article at the discharge station have been attempted. However, to the present no known device is capable of infallibly filling all of the article receiver positions on the drum periphery and accurately and rapidly discharging articles received at such positions at a precisely predetermined time during the rotation of the drum.

SUMMARY OF THE INVENTION

A high speed singulating device capable of ready modification to accommodate a variety of different types and sizes of articles, comprising a vacuum manifold disposed centrally of a rotating drum and communicated at predetermined increments to the periphery of the drum. The periphery of the drum is covered by an annular resilient band, preferably of elastomeric or like material, which may be readily distorted and which will rapidly return to its undistorted configuration after the distorting stress is relieved.

Article receiver pockets are formed in the outer periphery of the band, which band is readily removable from the periphery of the drum for substitution of a different band. Passage means are provided for communicating the pockets to the vacuum source during selected segments of the revolution of the drum.

Discharge means are provided, to be actuated as the drum traverses a predetermined segment of its revolution adjacent a discharge station, the discharge means interrupting the vacuum source to the pockets and thereafter outwardly deforming the pockets, to reduce the concavity thereof, the combined action of the discharge means assuring a positive ejection at a precisely determinable point in the rotation of the drum.

Since direct contact with the article is preferably avoided, delicate articles will not be damaged in the course of ejection.

It is therefore an object of the invention to provide a high speed singulating device which is useful in conjunction with a wide variety of articles.

A further object of the invention is the provision of a device of the class described in which positive ejection is assured, thus permitting high speed operation without fear that article carrying pockets will be transported beyond the discharge station without release of their contents, a problem which has heretofore limited the speed of operation of known devices of this sort.

A further object of the invention is the provision of a device of the class described which is enabled to be readily adapted to handle articles of different sizes and shapes and which, if desired, may discharge the articles in a predetermined position or orientation, e.g. head first, shank first, etc.

It is a further object of the invention to provide a device of the class described wherein even the most delicate article may be discharged without fear of damage from the discharge mechanism.

To attain these objects and such further objects as may appear herein or be hereinafter pointed out, reference is made to the accompanying drawings, forming a part hereof, in which:

FIG. 3 is a magnified end elevational view of a segment of the periphery of the drum of the device;

FIG. 4 is a magnified section taken on the line 4—4 of FIG. 2;

FIG. 5 is a magnified fragmentary section taken on the line 5—5 of FIG. 4;

FIG. 5a is a magnified fragmentary view of a portion of FIG. 5;

FIG. 6 is a sectional view taken on the line 6—6 of FIG. 4, showing details of construction;

FIG. 7 is a perspective view of the discharge station of the device, and

FIG. 8 is a section taken on the line 8—8 of FIG. 7.

Figure 1:
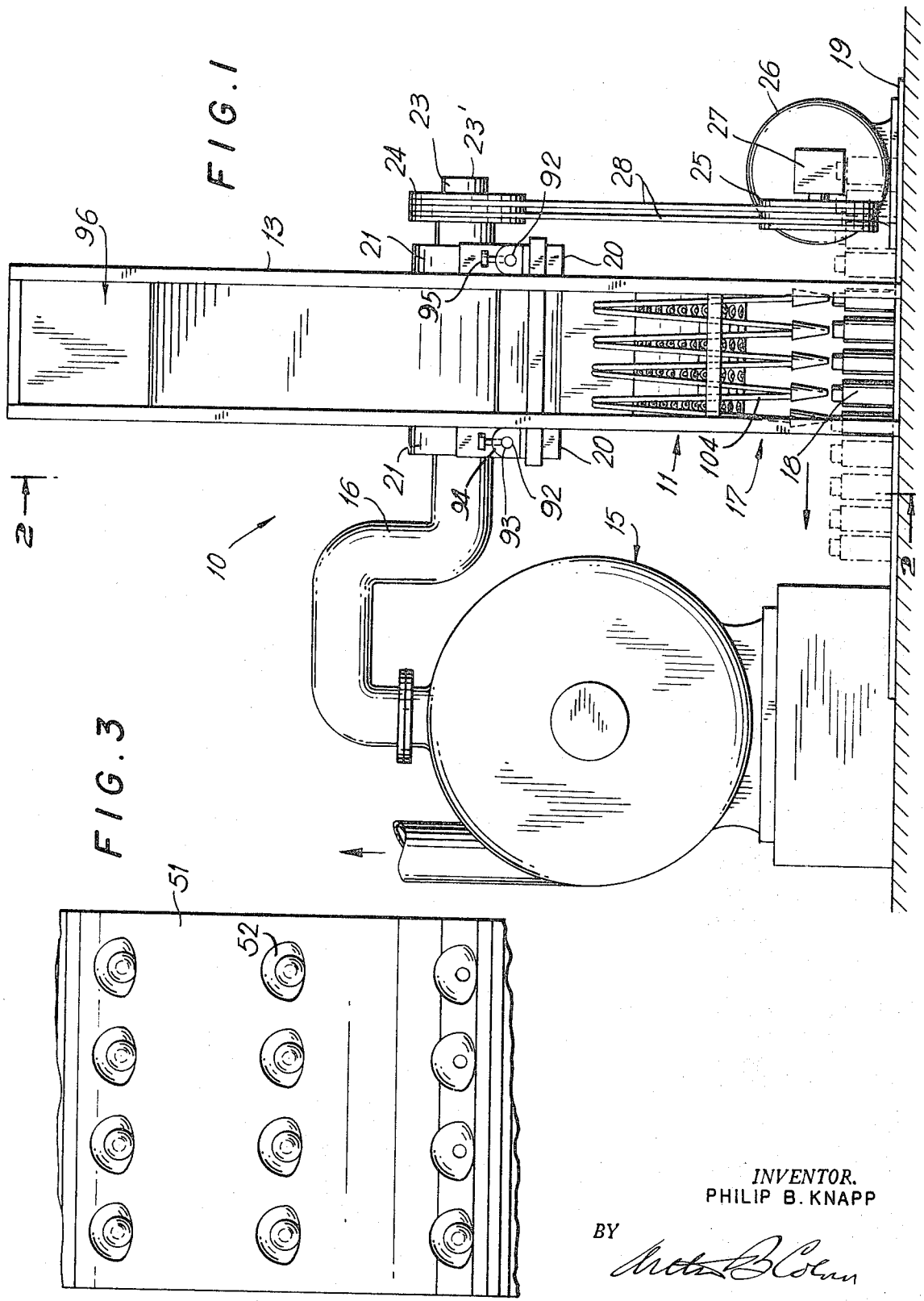
FIG. 1 is a side elevational view of a device in accordance with the invention.

Referring now to the drawings, the singulating apparatus 10 comprises a frame 11 which supports the rotating drum assembly 12, disposed within the cover or shroud 13. The drum, as will be more fully explained hereinafter, is designed to carry on its periphery a series of articles, such as pills, ball bearings, seeds, tool parts, received from a hopper assembly 14. The articles are received and/or maintained on the periphery of the drum by partial vacuum developed in a vacuum apparatus 15, the vacuum being communicated to the drum by a vacuum manifold 16.

Articles are serially discharged at a discharge station 17, the discharged articles being preferably received by containers 18 supported on an intermittently advancing conveyer belt 19, the advancement of the conveyor belt being timed to locate a series of containers in proper position to receive articles discharged at the station 17 after filling of the prior series of containers.

Since the invention hereof is concerned solely with the apparatus for receiving the articles from the hopper and depositing the same at the discharge station, the ensuing description will be limited to such means, it being understood that other forms of hoppers and discharge receiver mechanisms may be readily employed and the invention is not to be taken as limited to the illustrated forms.

The frame 11 includes a spaced parallel pair of horizontally disposed support rails 20, 20, to which rails are mounted in coaxial alignment a spaced pair of bearing assemblies 21, 21. The bearing assemblies are provided with registering bearing apertures 22, 22, which apertures rotatably support the tubular cross shaft 23. The cross shaft 23 carries a pulley 24. The pulley is linked to a drive pulley 25, rotated by motor 26 operating through a speed reducer 27. A pair of belts 28 link the pulleys 24, 25 so that the shaft 23 is rotated when the motor is operated.

Optionally but preferably, the motor 26 also drives conveyer belt 19 through an intermittent linkage, such as a Geneva drive, although any of a variety of arrangements for synchronizing the conveyor and the singulating apparatus may be used.

Figure 2:
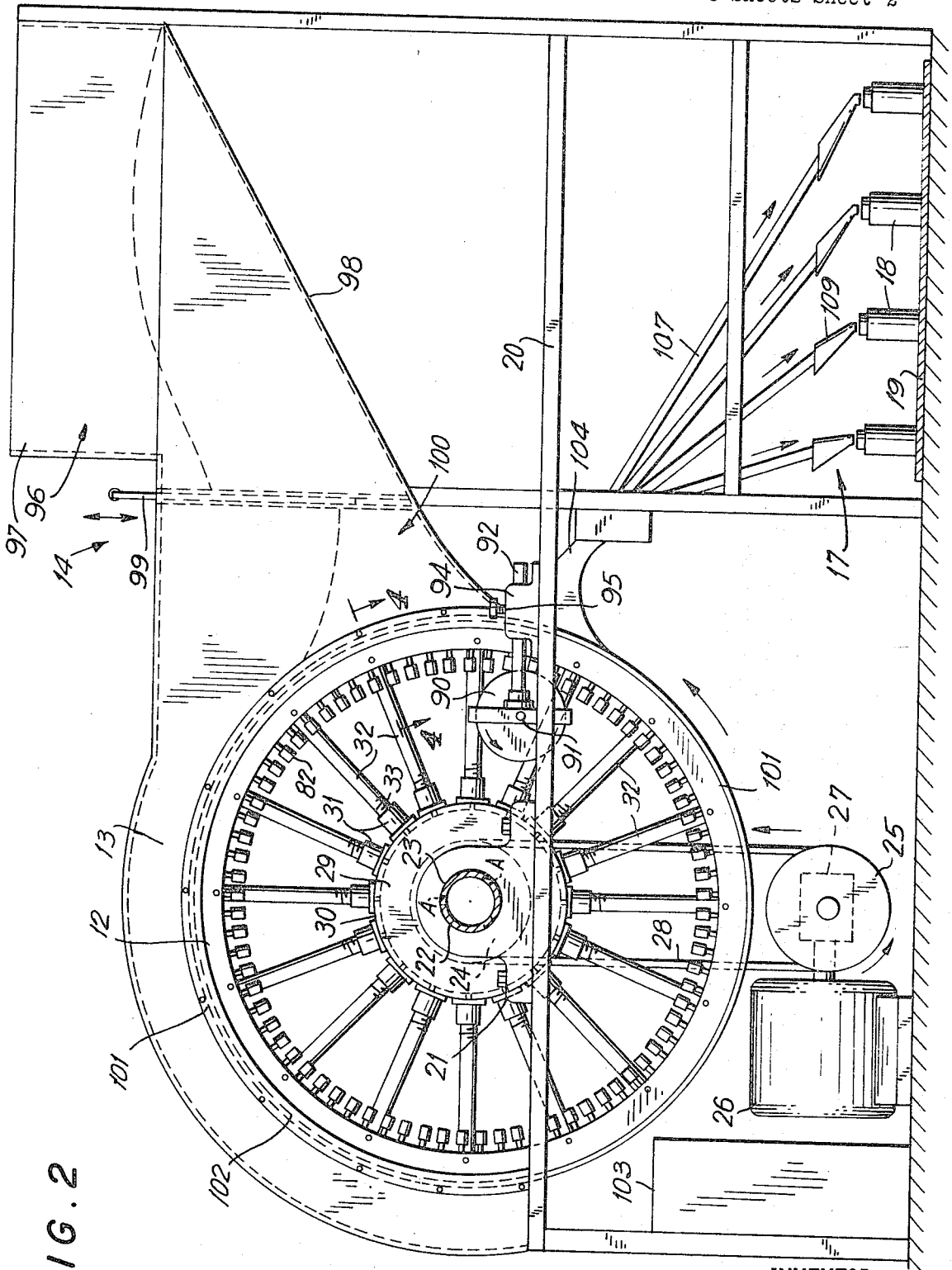
FIG. 2 is a section taken on the line 2—2 of FIG. 1.

A pair of vertical, circular flanges 29 (FIG. 2) are secured to the tubular shaft 23, as by welding. The peripheries of the flanges are connected by an annular rim 30, to which rim a series of angularly spaced apart, radially directed spoke sockets 31 are connected, as by welding.

The flanges 29, their peripheral rim 30 and tubular shaft 23 define an essentially airtight chamber, communicated by a rotating seal (not shown) to the vacuum manifold 16. The shaft 23, forming the vacuum conduit, is provided with a series of apertures A for communicating the vacuum to the interior of the inner chamber, the end 23' of the shaft 23 remote from the manifold being sealed to the atmosphere.

The sockets 31 (FIG. 2) are preferably internally threaded and each socket carries a radially directed, hollow support spoke 32, the inner ends 33 of the spokes being threaded into the sockets 31.

An outer annular vacuum chamber assembly 34 (FIG. 4) is mounted for rotation with the shaft 23 by connection with the outer ends 35 of the spokes 32, the vacuum source being communicated to the interior of the assembly 34 through the center of the hollow spokes 32.

The outer vacuum chamber or drum 34 comprises inner and outer cylinders 36, 37, respectively, which are supported in concentric disposition by a series of radially directed struts 38. The struts 38 may extend through registering apertures 39, 40 in the outer and inner cylinders 37, 36 respectively. A pair of lock nuts 41, 42 with interposed lock washers, surround the aperture 40, securely but adjustably fixing the struts 38 to the inner cylinder.

A lock nut 43 presses a lock washer 44 against the inner circumference of the outer cylinder 37, the washers optionally but preferably being formed of an elastomeric composition or the like, to minimize the possibility of air leakage.

It will be understood that the struts firmly support the inner and outer cylinders 36, 37 in predetermined coaxial position. Annular side plates 45, 46 are bolted to the side faces of the cylinder members 36, 37 to define the lateral boundaries of the annular vacuum chamber assembly 34. The thus constituted annular assembly 34 is provided with spaced spoke receiver fittings 47 preferably welded to the inner cylindrical member 36, the fittings 47 being internally threaded at 48 to receive the externally threaded portions 49 at the outer ends 35 of the spokes 32.

From the foregoing it will be appreciated that the tubular spokes 32 provide vacuum conduits linking the interior of the outer annular drum or vacuum chamber 34 with the vacuum source at the center of the apparatus.

The outer cylindrical 37 is provided with a series of radially directed apertures 50, the apertures being preferably aligned in rows transversely across the cylinder surface, each row constituting four apertures in the illustrated embodiment (see FIG. 3). An endless annular belt member 51 is disposed about the outer periphery of the cylinder 37, the belt being formed of a resilient, readily deformable material, an elastomer being a preferred example.

The yieldable band 51 is formed with a series of shaped concavities or pockets 52, the pockets having radial through passages 53 extending inwardly from the base of the pockets. The band 51 is applied in such manner that the through passages 53 leading to the pockets 52 are aligned in registry with the apertures 50 in the outer cylindrical plate 37. It will thus be seen that the vacuum or subatmospheric pressure existing in the annular chamber 34 will be communicated to the atmosphere through the apertures 50, passages 53 and pockets 52.

Preferably, the pockets are shaped in a manner best seen in FIG. 5a, such that in the normal or unstressed condition, the lead edge 52a of the pocket is defined by a gradually inclined surface, whereas the trailing edge 52b of the pocket is defined by a rather abrupt or essentially radially directed slope. By this configuration it has been determined that there is a greatly minimized chance that a pocket will be unfilled after the same has been moved through the hopper area, as will be more fully explained hereinafter.

Associated with each of the pockets 52 is an ejector mechanism 54, the operation of which will be best appreciated from a consideration of FIGS. 4 and 5.

The ejector mechanism includes a tubular bearing sleeve 55 fixed in a radially directed aperture 56 formed in the inner cylindrical member 36. In order to accommodate each of the four transversely directed pockets of a row, there are provided two ejector mechanisms located side by side, each of which effects ejection of two pockets. Since all of the ejector mechanisms are identical, a description of one will suffice.

The bearing sleeve 55 is provided with a radially directed bore 57, within which is shiftably mounted a plunger 58. A second bearing sleeve 59 extends inwardly through, and is fixed to, the outer cylindrical portion 37 in coaxial alignment with sleeve 55, the outer end 60 of the plunger 58 being slidably received in the bearing aperture of the sleeve 59. The sleeve 59 is provided with a pair of opposed, radially directed slots 61, within which slots are received cross pin 62 made fast to the plunger 58.

It will thus be observed that inward and outward radial movement of the plunger is made possible, but the action of the pin 62 in the slots 61 prevents any rotary movement of the plunger within the bearings 55 and 59.

A transversely directed yoke or cross bar 63 is carried on the plunger 58, the bar being centrally apertured at 64, the plunger 58 passing through the aperture 64 and being suitably secured to the plunger against relative movement axially of the plunger. The securing may be effected by coupling providing a lost motion or override connection such as a lift pin 64a bearing against notch 64b on the underside of bar 63; downward movement of the plunger being transmitted to the bar by a snap ring or like driver (not shown).

The cross bar, adjacent its outer ends, is provided with a pair of threaded apertures 65, 66, within which apertures are threadedly mounted the radially directed ejector pins 67, 68 respectively. Lock nuts 69 and lock washers 70 are mounted over the ends 71, 72 of the ejector pins 68, 67, to prevent the ejector pins from accidental deviation from an initially adjusted position relative to the cross bar 63.

The outer ends of the pins 67, 68 are covered by ejector pads 73, 74, respectively, which pads, as seen from FIG. 4, are disposed in registry with the apertures 50 extending through the outer cylindrical member 37. The pads optionally may be composed of rubber, nylon or other wear resistant plastic, or metal. Preferably, a rubber shock absorber gasket member 75 is disposed about the plunger and interposed between the lower end of the bearing sleeve 55 and the upper end of the cross bar or yoke 63.

The upper end of the plunger is provided with a knurled adjustment screw 76 controlling a radially inwardly directed shank 77. An annular shoulder 78 is disposed adjacent the adjustment member 76, a coil spring 79 being biased under the compression between the annular shoulder 78 and the inner face 80 of the bearing member 55. The radially inwardly projected extent of the shank 77 may be controlled by adjustment of the knurled portion 76, a lock nut 81 being provided to fix the parts in their adjusted positions. A cap member 82 is affixed to the inner end of the shank 77, the cap being preferably formed of wear-resistant, high impact plastic.

As will be appreciated from the preceding description, discharge of the articles is effected by an outward radial movement of the plunger assembly, culminating ultimately in the ejector pads 73, 74 being shifted through the apertures 50 in the outer cylinder 37, the pads, in an earlier stage of movement, first sealing the apertures 53 leading to the pockets, continued outward movement of the pads outwardly deforming and, hence, reducing the concavity of the pockets 52, as will be more fully explained hereinafter.

The radial movmeent of the ejector assemblies is accomplished by a pair of kick-out rollers 90. The kick-out rollers are basically idlers rotatably mounted about horizontal axis shafts 91. The shafts 91 (only one being shown, see FIG. 2) extend inwardly from opposite sides of the drum assembly, the shafts being supported on adjustment rods 92. The adjustment rods 92 pass through keyed apertures 93 in rod support brackets 94 welded or otherwise secured to the horizontal support rails 20.

Threaded adjustment screws 95 are provided for adjusting the horizontal position of the rods 92, it being readily recognized that such horizontal movement will affect the amount of throw or outward shifting movement imparted by the rollers to the ejectors. Thus, the movement of the ejectors may be adjusted individually by varying the inward or outward extension of the shank 77, or as a group by varying the posititon of the kick-out rollers 90. Similarly, it will be appreciated that a further adjustment is provided for the individual ejectors carried by any one plunger assembly by varying the position of the individual pins 67 and 68.

Articles in bulk are introduced into a hopper 96 defined by side walls 97, the hopper including a bottom wall 98 inclined toward the drum. Optionally, a bulk supply gate or sluice 99 is introduced between the bulk hopper 96 and a temporary storage area 100 directly adjacent the periphery of the drum, the vertical adjustment of the gate 99 varying the flow of articles from the bulk hopper 96 to the temporary storage area 100.

In order to prevent haphazard spill off of articles not properly introduced into the pockets 52 upon rotation of the drum through the pick up area 100, the shrouds or side walls 13 of the apparatus are formed with an arcuate cutout area 101 closely following the periphery of the drum. Preferably, arcuate rubber strips 102 are bolted to the shrouds adjacent the cutout 101 and wipingly engage the annular side plates 45, 46, to prevent articles collected but not attached to the periphery of the drum from spilling over the sides. Preferably, an auxiliary collector bin 103 is disposed beneath the drum about 180° from the pickup station 100, to catch articles which are not attached to the periphery of the drum but are carried on the surface thereof.

Singulated articles discharged from the drum are received and deposited at the discharge station 17 by any conventional apparatus.

The discharge apparatus illustrated specifically in FIGS. 1, 7 and 8 comprises a series of chutes 104, four in number located transversely across and beneath the surface of the drum to correspond with the transverse spacing of the rows of pockets 52. The entrance to the chutes is disposed directly beneath the closest point of approach of the roller 90 to the ejector plungers, this being the position at which the ejectors are operated by the roller and at which the articles are discharged.

In the illustrated embodiment each chute is led to a discharge chamber 105 which feeds two separate supply nozzles 106, 107. A flip-flop or escapement shutter 108 may be introduced at the terminal end of the chute 104, the shutter being activated by passage of each successive article to deflect the next succeeding article from one to the other of the discharge nozzles 106, 107, in a manner well known. As a result and due to the high speed of operation, each chute of the device may be employed to fill two containers 18.

The nozzles 106, 107 may terminate in the usual funnel portions 109, to direct discharged articles through the throats of the containers 18 carried on the conveyor 19.

OPERATION

The operation of the apparatus will be evident from the preceding description. As the annular vacuum chamber assembly or drum 34 is rotated in a counterclockwise direction, the pockets 52 formed in the belt or band 51 are scanned through the pickup area 100. The pockets, as they enter the pickup area 100, have been previously emptied at the discharge station and exhibit their normal, undistorted configuratlion wherein they define a gradual lead-in area 52a and an abrupt trailing wall area 52b.

As each pocket is scanned through the pickup area, an article or element from the bulk supply will be introduced into the pocket and carried along in a tangential direction by the abrupt angle of the trailing edge 52b of the pocket. As the article is seated in the pocket, it is securely positioned by the vacuum intnroduced into the pocket through the passage 53 extending to the interior of the annular vacuum chamber 34.

Due to the readily deformable, resilient composition of the belt, the inward pressure of the article under the influence of the vacuum will tend to deform the article adjacent surfaces of the pocket so as tightly and intimately to cup the article within the pocket and permit a relatively rapid rotation of the annular drum, without fear of prematurely discharging the article under the influence of centrifugal force.

With continued rotation of the drum, the filled pockets are advanced toward the discharge station 17. At the discharge station 17, the discharge rollers 90 progressively engage against the cap member 82 of successive ejectors. With the initial radial outward movement induced by engagement of the rollers against the ejector caps 82, a concomitant outward movement of ejector pins 67, 68 and pads 73, 74 is effected. The throw of the ejector mechanisms is gauged to cause the pads 73, 74 to seal the passages 53 leading to the pockets 52, and thus cut off the pockets from the source of vacuum as the pockets reach the initial limits of the discharge station.

It is an important feature of the invention, and indeed, a significant contribution to the improved operation thereof, that the device of the present invention is characterized by a continued outward movement of the pads 73, 74 after the initial vacuum shut off, to the point whereat the pockets 52 are deformed or misshapen and are, in effect, reduced in concavity. This phenomenon is best illustrated in contrasting the sequential view of FIG. 5 and in comparing the solid line or normal position of the pockets of FIG. 5 with the dot and dash discharge positions of the pockets shown in FIG. 4. The outward deforming movement imparted to the pockets by the ejecting mechanism following interruption of the suction positively discharges each of the articles by imparting to the articles a degree of outward movement.

It is important to observe that, by reason of the use of the resilient, readily deformable annular band and of ejector pins which deform the band, the radial movement is imparted to the articles without ever engaging the articles with any part of the ejector mechanism. By this means, a yieldable but positive ejection action is provided which minimizes the possibility of damaging the articles in any way.

The released articles are received in the chutes 104 and distributed to the containers 18 in the manner previously described.

As the pockets continue to rotate beyond the roller station, springs 79 return the ejector mechanisms to their radial inward position, whereupon the pockets resiliently resume their normal, undistorted configuration as they enter the pickup area 100.

It will be readily appreciated that the action is continuous, that the pocket again receives an article from the bulk supply and carries it to the discharge area.

A further important feature of the invention is the ease with which the mechanism may be transformed for use in singulating articles of different sizes. To effect such transformation, it is merely necessary to remove the elastic belt or band 51, and sleeve into position on the outer periphery of the cylinder 37 another belt or band having pockets of the desired size and configuration.

From the foregoing it will be apparent that there is provided a singulating apparatus having numerous advantages and improvements over apparatuses heretofore known. For the first time there is provided in a single device the ability to achieve high speed pickup and discharge. Factors which augment the ability to achieve high speed pickup include the provision of a gradual lead-in surface and an abrupt trailing surface in the pocket portions, to secure rapid seating of the articles and minimize the outward deflecting tendencies of prior devices. The provision of a yieldable band surface which, under suction influences conforms to the configuration of the articles, more tightly to embrace and retain the articles is a further factor in the improved operation of the device.

High speed discharge is achieved primarily by the use of novel ejector mechanism which cuts off suction and thereafter positively deforms the pockets in an outward direction to reduce the concavity thereof or change the configuration thereof, to impart radial outward components of movement to the articles and by stretching or deforming the pockets, removing any vestiges of suction which may have remained between the articles and the pockets.

It will be further appreciated that the apparatus of the present invention may be employed to discharge articles of unusual shapes in a predetermined orientation. This is accomplished by shaping the pockets in a desired manner and/or by the employment of baffles or wiper mechanisms within the hopper which will clear from the periphery of the drum any article or articles disposed in the pockets in a configuration other than that desired.

While the apparatus has been described primarily as a singulator for separating single or discrete articles from a bulk supply, it will be appreciated that by proper coordination of the pocket size and articles to be received therein, a predetermined plurality of articles may be supported in each pocket during each pass, and the term singulating device is to be broadly interpreted to encompass the concept of isolation or singulating a predetermined batch or series of articles in each pocket.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. A singulating apparatus for separating discrete objects, such as pills, seeds, machine parts or the like, comprising a hopper having a hopper discharge zone, a rotatable drum assembly including a resilient, peripheral portion movable through said discharge zone, a multiplicity of object receiver pockets formed on the outer surface of said peripheral portion, passages extending inwardly from said pockets to the interior of said drum, vacuum manifold means within said drum, said vacuum means being communicated to said pockets through said passages, a discharge station, and ejector means at said discharge station for separating said passages from said manifold means and outwardly deforming said pockets as said pockets sequentially traverse said station.

2. A device in accordance with claim 1 wherein said ejection means is shiftable toward and away from said peripheral portion.

3. A device in accordance with claim 2 wherein said ejector means comprises radially shiftable plungers having an end portion shifted to a first radial position in sealing relation of said passages and thereafter to an outward radial position, outwardly to deform said pockets while maintaining said seal.

4. A device in accordance with claim 1 wherein said pockets are concave and said ejector means is effective to reduce said concavity.

5. A singulating device for pills, seeds, machine parts and like articles comprising a hopper having a discharge zone, a rotating drum assembly including a resilient peripheral portion shiftable through said discharge zone, a plurality of angularly spaced-apart, outwardly open receiver pocket members formed in said peripheral portion, suction means for forming a vacuum within said drum, passage means extending from said pocket members to the interior of said drum, thus to connect said pocket members and suction means, and a discharge station including discharge means for sequentially disconnecting said passages from said suction means and outwardly deforming the pocket having the disconnected passage as it passes said discharge station.

6. A high speed singulating device for pills, seeds, machine parts and like discrete articles comprising a hopper having a discharge zone, a rotating drum assembly disposed adjacent said discharge zone, an annular, resilient, deformable belt member disposed about the periphery of said drum, a multiplicity of outwardly open concave article receiver pockets formed on the outer surface of said belt means, portions of said outer surface being continuously advanced through said discharge zone in direct contact with the articles in said zone by said rotating drum assembly, vacuum means in said drum assembly in communication with said pockets, a discharge station downstream of said discharge zone and ejector means at said discharge station for temporarily de-coupling said pockets from said vacuum means and outwardly deforming said decoupled pockets.

7. A device in accordance with claim 6 wherein said annular resilient band is elastically supported on said drum.

8. A device in accordance with claim 6 wherein said band is removable from said drum and replaceable by a second band having pockets of a size differing from the size of the pockets of said band.

9. A high speed singulating device for pills, seeds, machine parts and the like discrete articles, comprising a hopper having a discharge zone, a drum assembly rotating adjacent said discharge zone and including an annular support, a resilient, deformable, peripheral cover portion mounted on said annular support progressively advanced through said zone in direct contact with said articles, a multiplicity of outwardly open, concave pocket members formed in said cover portion, apertures formed in said support surface, the pocket members of said cover portion being in registry with said apertures, passage means formed through said cover portion in registry with said apertures for communicating said apertures with said pocket members, vacuum means in said drum for communicating suction to said pockets through said apertures and passages, and ejector means including plunger portions shiftable radially through said apertures into contact with said cover, said plunger means being shifted progressively into passage blocking position and thereafter to outward deforming position of said cover.

10. A device in accordance with claim 9 wherein said ejector means are mounted to said drum assembly for rotation therewith, said device including cam means for shifting said ejector means radially outwardly at a selected point in the rotation of said device.

11. A device in accordance with claim 10 and including spring return means for said ejector means.

References Cited
FOREIGN PATENTS
804,968   5/1951   Germany.

SAMUEL F. COLEMAN, Primary Examiner